(12) United States Patent
Baruah et al.

(10) Patent No.: US 12,712,806 B2
(45) Date of Patent: Aug. 18, 2026

(54) RESILIENCY AND SYMMETRIC ROUTING IN NETWORKS DURING SERVICE CHAIN FAILURE

(71) Applicant: Cisco Technology, Inc., San Jose, CA (US)

(72) Inventors: Pritam Baruah, Fremont, CA (US); Satish Mahadevan, San Ramon, CA (US); Laxmikantha Reddy Ponnuru, San Ramon, CA (US); Balaji Sundararajan, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 329 days.

(21) Appl. No.: 18/626,759

(22) Filed: Apr. 4, 2024

(65) Prior Publication Data

US 2025/0317384 A1 Oct. 9, 2025

(51) Int. Cl.

*H04L 45/28* (2022.01)
*H04L 45/02* (2022.01)
*H04L 45/76* (2022.01)

(52) U.S. Cl.

CPC .............. *H04L 45/28* (2013.01); *H04L 45/02* (2013.01); *H04L 45/76* (2022.05)

(58) Field of Classification Search

CPC ......... H04L 45/00; H04L 45/02; H04L 45/28; H04L 45/76

See application file for complete search history.

(56) References Cited

U.S. PATENT DOCUMENTS 8,391,134 B2 * 3/2013 Cole ..................... H04L 49/552 370/255
10,805,407 B2 10/2020 Chou et al.
12,489,702 B1 * 12/2025 Thangavel ............ H04L 45/124
2002/0184393 A1 12/2002 Leddy
2015/0263899 A1 * 9/2015 Tubaltsev ............. H04L 45/033 370/254
2015/0381493 A1 * 12/2015 Bansal .................. H04L 45/745 370/392
2017/0155724 A1 6/2017 Haddad
2021/0021485 A1 * 1/2021 Guim Bernat ...... H04L 41/5096
2021/0367851 A1 11/2021 Singhal et al.

(Continued)

OTHER PUBLICATIONS

1 Search Report and Written Opinion for International Application No. PCT/US25/23278, Dated Jul. 4, 2025, 14 pages.

*Primary Examiner* — Eric Nowlin
(74) *Attorney, Agent, or Firm* — Lee & Hayes, P.C.

(57) ABSTRACT

Techniques for making the state of a peering connections or routes between SD-WAN routers of an SD-WAN fabric and external routers dependent on the state of a local instance of a service chain of redundant service chains in the SD-WAN fabric. In examples, an SD-WAN router may determine that a local instance of a service chain is unavailable for inspecting network traffic, and terminate a peering session with an external router such that routes through the SD-WAN router are no longer available to the external router. In other examples where the SD-WAN router determines that the local instance of the service chain is unavailable, the SD-WAN router may use an update message to notify the external router that certain routes are not available through the SD-WAN router for network traffic that needs to be service-chained.

20 Claims, 8 Drawing Sheets

(56) References Cited

U.S. PATENT DOCUMENTS

2022/0014423 A1 1/2022 Smith
2022/0116267 A1* 4/2022 Tada .................. H04L 41/0659
2022/0337514 A1 10/2022 Lu
2023/0283689 A1 9/2023 Sawant
2024/0163313 A1* 5/2024 Qian ...................... H04L 63/20
2025/0063461 A1* 2/2025 Srinivasan .......... H04W 40/125
2025/0274385 A1* 8/2025 Painter .................... H04L 45/42

* cited by examiner

RESILIENCY AND SYMMETRIC ROUTING IN NETWORKS DURING SERVICE CHAIN FAILURE

TECHNICAL FIELD

The present disclosure relates generally to techniques related to routing data through a Software-Defined Wide-Area Network (SD-WAN) fabric that has experienced a service chain failure.

BACKGROUND

Computer networks are collections of interconnected computers and other devices that communicate over connections to share information and resources among the connected devices. These networks include various types of network devices to communicate data and provide resources and services, such as routers, switches, firewalls, servers, endpoint devices, wireless controllers, and so forth. There are various types of networks, such as Local Area Networks (LANs) of endpoints or user devices, and Wide Area Networks (WANs) that provide between remote LANs and over large geographic areas. Many of these networks utilize software-based controllers that dynamically manage and optimize the networks. For instance, controllers are used to create Software-Defined WANs (SD-WANs) where the controllers implement software-defined networking (SDN) principles to simplify network management and improve performance.

SD-WAN deployments often include edge devices, such as routers, hubs, or appliances, which communicate with the centralized controller and implement network policies. As an example, service chains may be instantiated in edge devices (e.g., SD-WAN routers) such that network traffic is directed through a predefined sequence of virtualized network services or functions to achieve specific objectives of the service chain, such as security, optimization, or compliance. However, if an SD-WAN router experiences an outage or is removed for maintenance, the service chain is in turn taken offline such that traffic cannot be routed through the virtualized network functions of the service chain.

In order to provide redundancy, failover, and load-balancing for a service chain, the service chain may be instantiated in two or more SD-WAN routers. In this way, if one of the SD-WAN routers or its respective service chain has an outage, network traffic can still be routed through the other SD-WAN router and redundant service chain instantiated in that router. In such examples, the controller of the SD-WAN may notify other SD-WAN devices of the outage experienced by SD-WAN router and/or its respective service chain, and that network traffic that needs to have policy applied by the service chain is to be directed to the active SD-WAN router and service chain. However, various issues may arise due to external devices located outside of the SD-WAN being unaware of the outage experienced by the SD-WAN router and/or service chain.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
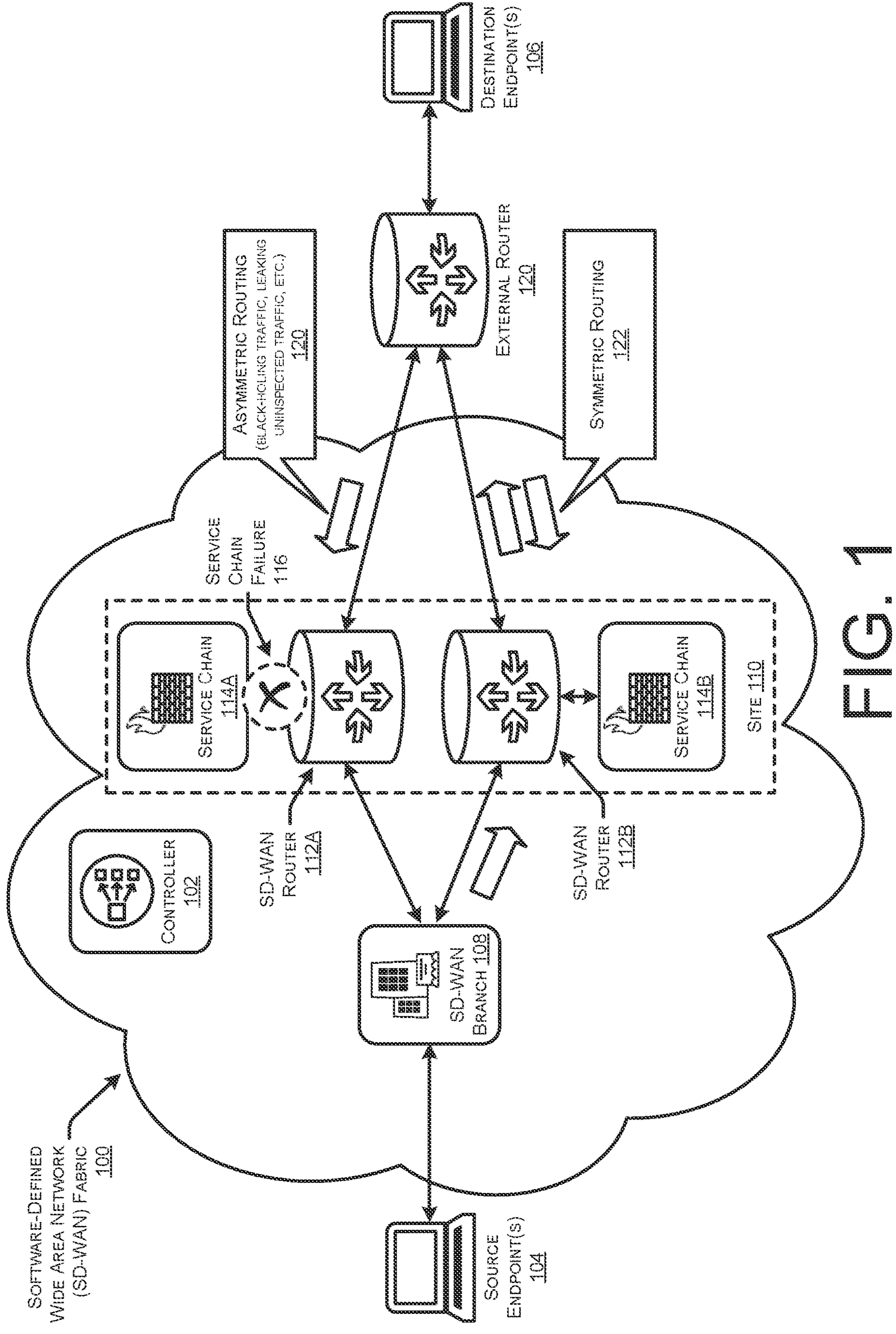
FIG. 1 illustrates a system-architecture diagram including an SD-WAN fabric where a service chain is instantiated in multiple SD-WAN routers, and symmetric routing is maintained with an external device despite an outage with an instantiation of the service chain.

This disclosure describes techniques for making the state of a peering connections or routes between SD-WAN routers of an SD-WAN fabric and external routers dependent on the state of a local instance of a service chain of redundant service chains in the SD-WAN fabric.

A first method to perform techniques described herein includes establishing a first connection between a first endpoint and a first SD-WAN router in the SD-WAN fabric. In some examples, the first SD-WAN router is connected to a first service chain in the SD-WAN fabric. The first method may further include establishing a peering connection between the first SD-WAN router and an external router located exterior the SD-WAN fabric. In some examples, the peering connection may be configured to exchange routing information between the first SD-WAN router and the external router. The first method may further include sending, from the first SD-WAN router and using the peering connection, a route advertisement to the external router. In some instances, the route advertisement may indicate a route from a second endpoint associated with the external router and to the first endpoint that passes through the first SD-WAN router. Further, the first method may include determining that the first service chain is unavailable, and based at least in part on the first service chain being unavailable, terminating the peering connection between the first SD-WAN router and the external router such that the route is withdrawn.

A second method to perform techniques described herein includes establishing a first route between a first endpoint and a second endpoint that passes through a first SD-WAN router in the SD-WAN fabric, where the first SD-WAN router is connected to a first service chain in the SD-WAN fabric. Additionally, the second method may include establishing a second route between the first endpoint and a third endpoint that passes through the first SD-WAN router in the SD-WAN fabric. The second method may further include determining that the first SD-WAN router is configured to route first traffic communicated with the second endpoint through the first service chain, and determining that the first SD-WAN router is not configured to route second traffic communicated with the third endpoint through the first service chain. Additionally, the second method may include determining that the first service chain is unavailable. Based at least in part on the first service chain being unavailable and the first SD-WAN router being configured to route the first traffic communicated with the second endpoint through the first service chain, the second method may include withdrawing the first route from a route-map of the first SD-WAN router, and sending, to an external router associated with the second endpoint, an update message indicating that first route is withdrawn.

Additionally, the techniques described herein may be performed by a system and/or device having non-transitory computer-readable media storing computer-executable instructions that, when executed by one or more processors, performs the first and second methods described above.

Example Embodiments

SD-WAN fabrics often instantiate service chains in edge devices, such as SD-WAN routers, through which network traffic is directed to apply a predefined sequence of virtualized network services or functions to achieve specific objectives of the service chain, such as security, optimization, or compliance. In order to provide redundancy, failover, and load-balancing for a service chain, the service chain may be instantiated in two or more SD-WAN routers. In this way, if one of the SD-WAN routers or its respective service chain has an outage, network traffic can still be routed through another SD-WAN router and redundant service chain instantiated in that other router. In such examples, a controller of the SD-WAN may notify other SD-WAN devices of the outage experienced by SD-WAN router and/or its respective service chain, and that network traffic that needs to have policy applied by the service chain is to be directed to the other active SD-WAN router and service chain. However, various issues may arise due to external devices located outside of the SD-WAN being unaware of the outage experienced by the SD-WAN router and/or service chain.

Consider an example where a source endpoint communicates over an SD-WAN fabric to reach a destination endpoint where the destination endpoint is reachable via an external router that is located outside the SD-WAN fabric. The network traffic communicated between the source endpoint and destination endpoint may need to be service chained, and the instances of the service chain may be available in multiple SD-WAN routers, referred to in this example as "router A" and "router B." The source endpoint may send network traffic towards the destination, and in this example, assume that the network traffic is sent to router A to be service chained before being forwarded to the external router and the destination endpoint. The external router may know that instances of the service chain are available in router A as well as router B, but the external router may prefer to send return network traffic from the destination device through router A. For instance, if the routers use Border Gateway Protocol (BGP), a discriminator such as AS-PATH length attributes or Multi-Exit Discriminator (MED) attributes may be used to cause the external router to prefer router A as the path to communicate network traffic with the source endpoint. After routing convergence, the network traffic will flow symmetrically where the forward path is from the source endpoint to the router A, to the external router, and then the destination endpoint, and the return path is from the destination endpoint to the external router, to router A, and ultimately to the source endpoint.

However, in an example where the local instance of the service chain in router A goes down, the SD-WAN devices that communicate traffic from the source endpoint will be notified by the SD-WAN controller to instead send the network traffic to router B to be service chained. The external router will not be notified to communicate traffic using router B, and the external router may continue to send return traffic to router A. This results in an asymmetric path and a failure of service resiliency. Further, because service insertion is stateful, this may lead to black-holing and, depending on the configuration, can even result in traffic leaking through router A and to the source endpoint without getting subjected to the service chain.

This disclosure describes techniques for making the state of a peering connections or routes between SD-WAN routers of an SD-WAN fabric and external routers dependent on the state of a local instance of a service chain of redundant service chains in the SD-WAN fabric.

In an example, assume that all network traffic communicated between endpoints that lands on router A needs to be service chained by the local instance of the service chain. In such an example, router A and the SD-WAN controller may work to make the state of a peering session, such as a BGP session, dependent on the state of the local instance of the service chain. Router A may include a service tracker that continuously, or periodically, probes the local instance of the service chain to determine a current state of the service chain (e.g., available, unavailable, etc.). In examples where the service chain is unavailable, router A may terminate the peering session with the external router such that the external router withdraws the route to the source endpoint that passes through router A.

In another example, there may be multiple destination endpoints that communicate using routes through router A, such as destination endpoint A and destination endpoint B. Traffic communicated with destination endpoint A may need to be service chained, but traffic communicated with destination endpoint B may not need to be service chained. In such examples, router A and the controller may work to make the advertisement and withdrawal of destination routes between the external router and SD-WAN devices dependent on the state of the local instance of the service chain on router A. For instance, router A may withdraw a route between destination device A and the source endpoint from a route-map of the SD-WAN router, and also send an update message to the external router indicating that the route is withdrawn. This may cause the external router to then route traffic through a different router, such as router B, that has a local instance of the service chain.

Although the techniques described herein are primarily with respect to BGP and SD-WANs, the techniques are applicable to other communications protocols and other types of networks.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram including an SD-WAN fabric 100 where a service chain is instantiated in multiple SD-WAN routers, and symmetric routing is maintained with an external device despite an outage with an instantiation of the service chain. The SD-WAN fabric 100 may include a controller 102 which services as a centralized management and orchestration component responsible for overseeing the entire SD-WAN fabric 100. The controller 102 may be used to define and enforce network policies, including traffic routing, quality of service (QOS), and security measures, ensuring consistent application of policies across all edge devices. The controller 102 may help coordinate dynamic path selection by intelligently routing traffic based on real-time network conditions and application requirements. By continuously monitoring network performance metrics, the controller 102 may adaptively steer traffic to the most optimal path, improving application performance and user experience.

The SD-WAN fabric 100 may be used by one or more source endpoints 104 that communicate with one or more destination endpoints 106. The source endpoint(s) 104 and destination endpoint(s) 106 may be any type of device that can communicate over networks, such as user devices (e.g., desktop computers, laptop computers, phones, tablets, wearable devices, entertainment devices such as televisions, etc.), network devices (e.g., servers, routers, switches, access points, etc.), and/or any other type of computing device. The SD-WAN fabric 100 may include a mesh of connections between network devices such as access points, switches, and routers that transports data to its destination. The term "fabric" can mean the physical wirings that make up these connections, but may refer to a virtualized, automated lattice of overlay connections on top of the physical topology. The SD-WAN fabric 100 may include any combination of networks in addition to WANs, such as Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.)—both centralized and/or distributed—and/or any combination, permutation, and/or aggregation thereof. The SD-WAN fabric 100 is "software-defined" because the control plane is abstracted from the physical infrastructure and is managed centrally through the controller 102. Thus, the SD-WAN fabric 100 may include a network architecture that leverages software-defined networking (SDN) principles to simplify and automate network management, enhance security, and provide better visibility and control over network resources.

In the illustrative embodiment, the SD-WAN fabric 100 may include an SD-WAN branch 108 that connects the source endpoint(s) to a site 110 of the SD-WAN fabric 100. The SD-WAN branch 108 may refer to branch offices, remote sites, or locations within the SD-WAN fabric 100. The SD-WAN branch 108 typically hosts SD-WAN edge devices, such as routers or appliances, which serve as endpoints for managing network traffic, applying policies, and implementing security measures. The SD-WAN branch 108 may extend the reach of the SD-WAN fabric 100 to distributed locations, such as organization networks or other LANs, and enable the organizations to optimize connectivity, improve application performance, and enhance security across their entire network footprint. The SD-WAN branch 108 may connect the source endpoint(s) 104 to the one or more sites 110 in the SD-WAN fabric 100.

In the SD-WAN fabric 100, the site 110 may be a physical location or network endpoint that is part of the SD-WAN fabric 100. The site 110 can include branch offices, remote locations, data centers, or even cloud environments where SD-WAN edge devices are deployed. The site 110 may be equipped with SD-WAN edge devices, such as SD-WAN routers 112A and 112B, that serve as endpoints for managing network traffic, applying policies, and implementing security measures. The SD-WAN routers 112 connect to the SD-WAN fabric 100, forming a distributed network infrastructure that spans across multiple sites 110.

SD-WAN fabrics often instantiate service chains 114 in edge devices, such as the SD-WAN routers 112A and 112B, through which network traffic is directed. A service chain 114A may be instantiated in SD-Wan router 112A, and a second chain 114B may be instantiated in service chain 114B. The service chains 114A and 114B (referred to collectively as "service chains 114," and may comprise any number of service chains 114) are used to apply a predefined sequence of virtualized network services or functions to achieve specific objectives of the service chain, such as security, optimization, or compliance. The service chains 114 may apply any type of policy or function, such as WAN optimization and compression to reduce latency and bandwidth usage, security functions like firewalls and intrusion detection/prevention systems (IDS/IPS), Quality of Service (QOS) policies ensure reliable performance for latency-sensitive applications, enforcing compliance and governance standards, ensuring that network traffic adheres to regulatory requirements and organizational policies, and so forth.

In order to provide redundancy, failover, and load-balancing for a service chain 114, as shown, the service chain 114 may be instantiated in two or more SD-WAN routers 112. In this way, if one of the SD-WAN routers 112 or its respective service chain 114 has an outage, network traffic can still be routed through another SD-WAN router 112 and redundant service chain 114 instantiated in that other router. In such examples, the controller 102 of the SD-WAN fabric 100 may notify other SD-WAN devices of the outage experienced by SD-WAN router 112 and/or its respective service chain 114, and that network traffic that needs to have policy applied by the service chain 114 is to be directed to the other active SD-WAN router 112 and service chain 114. However, various issues may arise due to external devices located outside of the SD-WAN being unaware of the outage experienced by the SD-WAN router 112 and/or service chain 114.

In the illustrated example of FIG. 1, a source endpoint 104 communicates over the SD-WAN fabric 100 to reach a destination endpoint 106 where the destination endpoint 106 is reachable via an external router 120 that is located outside the SD-WAN fabric 100. The network traffic communicated between the source endpoint 104 and the destination endpoint 106 may need to be service chained, and the instances of the service chain 114 may be available in SD-WAN router 112A and 112B. The source endpoint 104 may sent network traffic towards the destination endpoint 106, and in this example, assume that the network traffic is sent through SD-WAN router 112A to be service chained before being forwarded to the external router 120 and the destination endpoint 106. The external router 120 may know that instances of the service chain 114 are available in SD-WAN router 112A as well as SD-WAN router 112B, but the external router 120 may prefer to send return network traffic from the destination endpoint 106 through SD-WAN router 112A. For instance, if the SD-WAN routers 112 and external router 120 use BGP, a discriminator such as AS-PATH length attributes or MED attributes may be used to cause the external router 120 to prefer the SD-WAN router 112A as the path to communicate network traffic with the source endpoint 104. In this example, after routing convergence, the network traffic will flow symmetrically where the forward path is from the source endpoint 104 to the SD-WAN router 112A, to the external router 120, and then the destination endpoint 106, and the return path is from the destination endpoint 106 to the external router 120, to SD-WAN router 112A, and ultimately to the source endpoint 104.

However, the service chain 114A and/or SD-WAN router 112A may experience a service chain failure 116 where the service chain 114A is no longer available to receive network traffic. In such an example, the SD-WAN router 112A may notify the controller 102 of the service chain 114A experiencing a failure, and the SD-WAN devices that communicate traffic from the source endpoint 104 (e.g., SD-WAN branch 108) will be notified by the controller 102 to instead send the network traffic to SD-WAN router 112B to be service chained. However, the external router 120 will not be notified to communicate traffic using SD-WAN router 112B, and the external router 120 may continue to send return traffic SD-WAN router 112A. This results in asymmetric routing 120 and a failure of service resiliency, and because service insertion is stateful, this may lead to black-holing and, depending on the configuration, can even result in traffic leaking through SD-WAN router 112A and to the source endpoint 104 without getting subjected to the service chain 114.

According to the techniques described herein, the SD-WAN router 112A may make the state of a peering connections or routes between the SD-WAN router 112A and the external router 120 dependent on the state of a local instance of a service chain 114A of redundant service chains in the SD-WAN fabric 100.

In one example, assume that all network traffic communicated between the source endpoint 104 and the destination endpoint 106 land on SD-WAN router 112A needs to be service chained by the local instance of the service chain 114A. In such an example, the SD-WAN router 112A and the controller 102 may work to make the state of a peering session, such as a BGP session, dependent on the state of the local instance of the service chain 114A. The SD-WAN router 112A may include a service tracker that continuously, or periodically, probes the service chain 114A to determine the current state of the service chain 114A (e.g., available, unavailable, etc.). In examples where the service chain 114A experiences a service chain failure 116 or is otherwise unavailable, the SD-WAN router 112A may terminate the peering session with the external router 120 such that the external router 120 withdraws the route to the source endpoint 104 that passes through SD-WAN router 112A. The external router 120 may then send network traffic through the SD-WAN router 112B to reach the source endpoint 104, which results in symmetric routing 122.

In another example, there may be multiple destination endpoints 106A and 106B that communicate using routes through SD-WAN router 112A, such as destination endpoint 106A and destination endpoint 106B. Traffic communicated with destination endpoint 106A may need to be service chained, but traffic communicated with destination endpoint 106B may not need to be service chained. In such examples, SD-WAN router 112A and the controller 102 may work to make the advertisement and withdrawal of destination routes between the external router 120 and SD-WAN routers 112 dependent on the state of the local instance of the service chain 114A on SD-WAN router 112A. For instance, SD-WAN router 112A may withdraw a route between destination endpoint 106A and the source endpoint 106 from a route-map of the SD-WAN router 112A, and also send an update message to the external router 120 indicating that the route is withdrawn. This may cause the external router 120 to then route traffic through a different router, such as SD-WAN router 112B, that has a local instance of the service chain 114B. However, a route between destination endpoint 102B and the source endpoint 104 may not be withdrawn and the traffic may continue to flow through the SD-WAN router 112A because the traffic does not need to be service chained.

This technique also ensures symmetric routing 122 where sent traffic and return traffic between communicating endpoints are routed through the same SD-WAN router 112 based on whether that traffic needs to be service chained.

Figure 2:
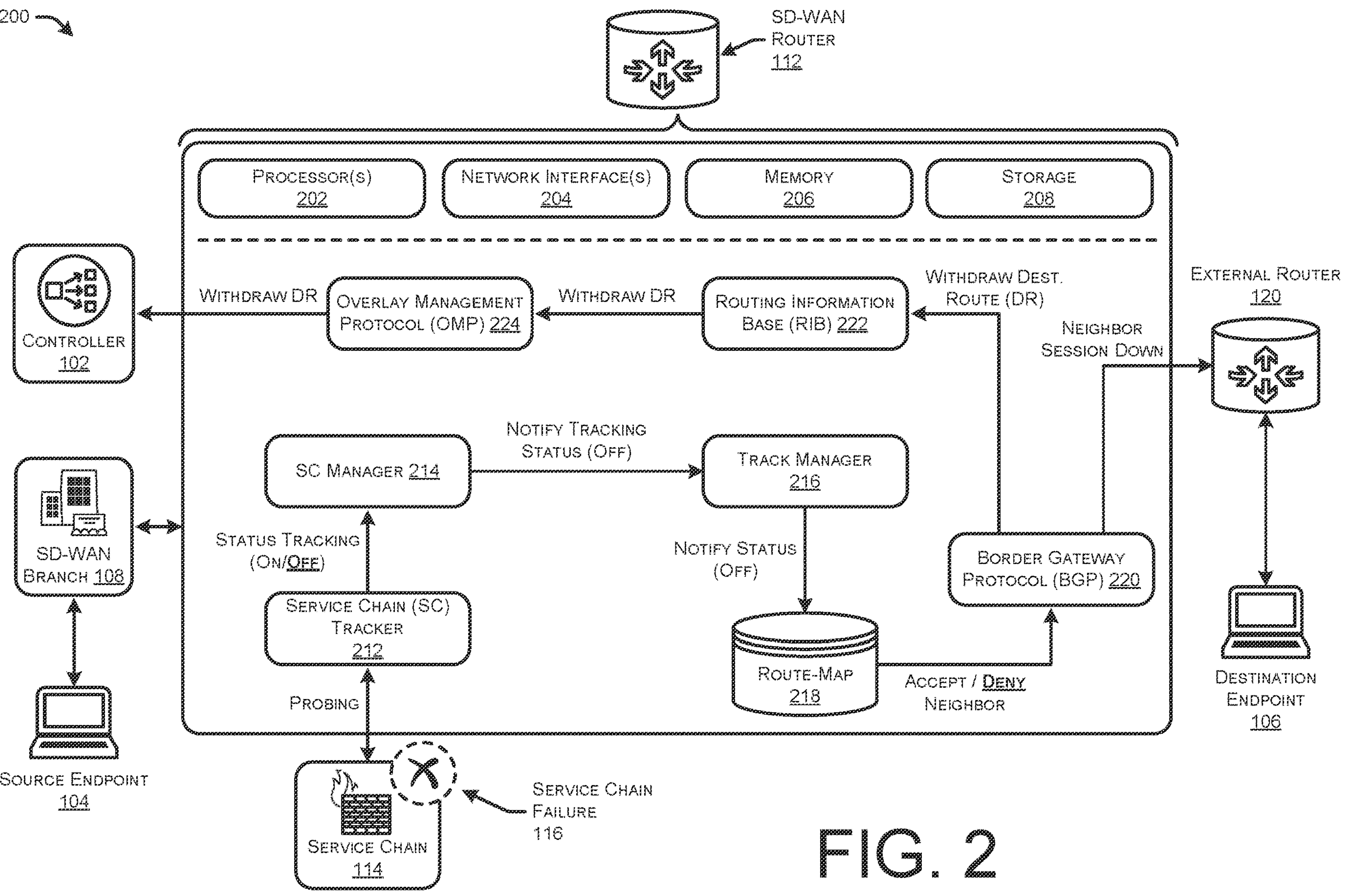
FIG. 2 illustrates a component diagram of an example SD-WAN router that terminates a peering session with an external router based on the state of a local instance of service chain of the SD-WAN router.

FIG. 2 illustrates a component diagram 200 of an example SD-WAN router 112 that terminates a peering session with an external router 120 based on the state of a local instance of service chain 114 of the SD-WAN router 112.

As illustrated, the SD-WAN router 112 may include one or more hardware processors 202 (processors), one or more devices, configured to execute one or more stored instructions. The processor(s) 202 may comprise one or more cores. Further, the SD-WAN router 112 may include one or more network interfaces 204 configured to provide communications between the SD-WAN router 112 and other devices. The network interfaces 204 may include devices configured to couple to personal area networks (PANs), wired and wireless local area networks (LANs), wired and wireless wide area networks (WANs), and so forth.

The SD-WAN router 112 may also include memory 206 (e.g., computer-readable memory) that stores various executable components (e.g., software-based components, firmware-based components, etc.). The memory 206 may comprise volatile and non-volatile memory, where the volatile memory, such as Random Access Memory (RAM), is temporary storage that holds data and program instructions actively being used by the CPU (Central Processing Unit). The memory 206 may include non-volatile memory (e.g., storage 208), such as storage devices like Solid State Drives (SSDs), Hard Disk Drives (HDDs), and Flash memory. Non-volatile memory is used for long-term storage of programs, operating systems, user data, and other information needed by the computing device. SSDs offer faster read and write speeds, lower power consumption, and greater reliability compared to traditional HDDs, making them increasingly popular in modern computing devices. Together, volatile and non-volatile memory work in tandem to provide the computing device with the necessary storage and processing capabilities to execute tasks efficiently and effectively. The memory 206 may store one or more operating systems utilized to control the operation of the one or more devices that comprise the SD-WAN router 112. Additionally, the storage 208 may comprise flash memory, a non-volatile storage medium, for storing firmware, operating system images, configuration files, and other essential data. The storage 208 may additionally, or alternatively, include hard disk drives (HDDs), Solid-state drives (SSDs) and/or other external storage devices such as flash drives or external hard drives, providing additional long-term storage capacity for backups, firmware updates, and other data storage needs.

The memory 206 may store one or more communication protocol components that enable the SD-WAN router 112 to communicate using various communication protocols. The communication protocol components enable effective communication between the SD-WAN router 112 and devices using communication stacks. This communication protocol components facilitate the exchange of information by defining a set of rules and conventions that devices must follow during communication. Communication protocols specify how data is formatted, transmitted, received, and interpreted, and the communication protocol components help the SD-WAN router 112 utilize communication stacks, which are layered structures of protocols, to establish reliable and standardized communication. Examples of communication protocols include LISP, BGP, TCP/IP (Transmission Control Protocol/Internet Protocol) for the Internet, Bluetooth for short-range wireless communication, and MQTT (Message Queuing Telemetry Transport) for lightweight messaging in IoT applications.

The memory 206 may store a routing component that makes decisions on how to route data packets between different networks using the routing tables. The routing component may determine the optimal path or route for data to travel from the source to the destination. Some of the key functions performed by the routing component include: (i) maintaining routing tables, which are databases containing information about available routes and their associated metrics (such as cost, distance, or bandwidth), (ii) using the routing tables to determine the best path for forwarding the packet based on various factors, such as the destination IP address, network topology, and routing metrics, to select the optimal route, (iii) forwarding data packets to next hops along routes, and (iv) implementing routing protocols (e.g., RIP, LISP, OSPF, BGP) to exchange routing information with neighboring routers such as information about network topology changes and help build and update the routing tables.

As shown, the SD-WAN router 112 may include a service chain (SC) tracker 212 that performs continuous or periodic probing to determine a state or status of the service chain 114. The SC tracker 212 used probing to monitor the service chain 114 and ensure it is functioning correctly and to detect any issues or failures. The probing may utilize any type of probing technology, such as ping probes (e.g., Internet Control Message Protocol (ICMP) echo requests), Hypertext Transfer Protocol (HTTP/HTTPS) probes, Transport Control Protocol (TCP) probes, User Datagram Protocol (UDP) probes, and/or custom application probes. The SC tracker 212 may apply logic to determine, using the probing, if the service chain is usable or not.

Using the probing, the SC tracker 212 may detect the service chain failure 116 in the service chain 114. The SC tracker 212 may then notify the SC manager 214 of the state or status of service chain 114. In some instances, the SC manager 214 may send the state of the service chain 114 to the SC manager 214, and the SC manager 214 may send the state to a track manager 216 to associate the state with an independent numbered track object (e.g., a "1" or "0" depending on the state). The track manager 216 may maintain the state of the service chain 114 by proxy with reference to the independent track object.

The track object maintained by the track manager 216 may be references in a route-map 218 of the SD-WAN router 112. The route-map 218 may generally be a configuration construct used in routing protocols such as BGP, Routing Information Protocol (RIP), and Enhanced Interior Gateway Routing Protocol (EIGRP). Generally, the route-map 218 is used to control the routing of packets based on various criteria, such as source IP address, destination IP address, prefix, or route attributes. The route-map 218 may comprise a series or sequency of match and set clauses where the match clauses define the criteria for selecting routes, while set clauses specify the action to be taken on matched routes. For example, a match clause might specify matching routes with a certain prefix length, and a set clause might specify setting a specific next-hop or changing the metric for the matched routes.

The track object is referenced in the route-map 218 and the route-map 218 will be reevaluated every time the service chain's 114 state changes (in addition to reevaluating under regular conditions). The SD-WAN router 112 may use the route-map 218 to determine whether or not to terminate a peering session with a neighbor, such as the external router 120. The SD-WAN router 112 and external router 120 may have established a peering connection, such as a BGP peering session, to exchange routing information. The peering session, once established, may be used by the SD-WAN router 112 and external router 120 to exchange routing information. For instance, each router sends updates to its peer, informing it about the network prefixes (IP address ranges) that it can reach, and these updates are exchanged in the form of BGP Update messages. Generally, the peering sessions indicate what routes are available, and if a peering session is taken down, then the routers are unable to route network traffic through the routes provided by, and advertised by, the routers.

In examples where the state of the service chain 114 is off or unavailable, the SD-WAN router 112 may use the route-map 218 to determine that the service chain 114 is unavailable, and determine to terminate a peering session with a neighbor, such as the external router 120. When the peering session is taken down with the external router 120, the external router 120 will no longer route traffic through the SD-Wan router 112 and to prefixes previously advertised by the SD-WAN router 112.

Thus, the route-map 218 is applied in an outgoing direction so that Local Area Network (LAN) routes can be withdrawn by terminating the peering session, and the route-map 218 may also be applied in an incoming direction so that destination routes can be withdrawn by BGP 220 from the routing information base (RIB) 222 based on the state of the service chain 114. The RIB 222 is a data structure that stores routing information learned from various sources, such as directly connected networks, dynamic routing protocols like OSPF or BGP, and static routes configured by network administrators. Generally, the RIB 222 is a database containing details about available network destinations and the paths to reach them. Each entry in the RIB 222 may include attributes such as the destination network prefix, the next-hop router or interface, the administrative distance associated with the route, and any metrics used to determine the best path. The RIB 222 maintains this information in a structured format, allowing the SD-WAN router 112 to efficiently process and select routes for forwarding packets.

By withdrawing the destination route to the destination endpoint 106 and/or external router 120 from the RIB 222, the SD-WAN router 112 may use an overlay management protocol (OMP) 224 to withdraw the destination route from the SD-WAN fabric 100. Generally, the OMP 224 is used in SDN environments, such as the SD-WAN fabric 100 to manage and control overlay networks. Overlay networks are virtual networks that are created on top of an existing physical network infrastructure, allowing for greater flexibility and abstraction. OMP is used to provide centralized management and control capabilities for overlay networks, enabling administrators to define and enforce network policies, monitor network traffic, and dynamically adjust network configurations as needed.

In this example, OMP 224 is used to signal to the controller 102 that the destination route has been withdrawn from the SD-WAN fabric 100. The controller 102 may then signal to all SD-WAN devices in the SD-WAN fabric 100 that the destination route to the external router 120 and/or destination endpoint 106 through the SD-WAN router 112 is withdrawn, and a different SD-WAN router 112 it to be used that has an associated service chain 114 that is available.

In this way, the state of the service chain 114 is used by the SD-WAN router 112 to withdraw routes to destination endpoints 106 for which network traffic needs to be inspected by the service chain 114 in response to the service chain 114 experiencing a service chain failure 116.

Figure 3:
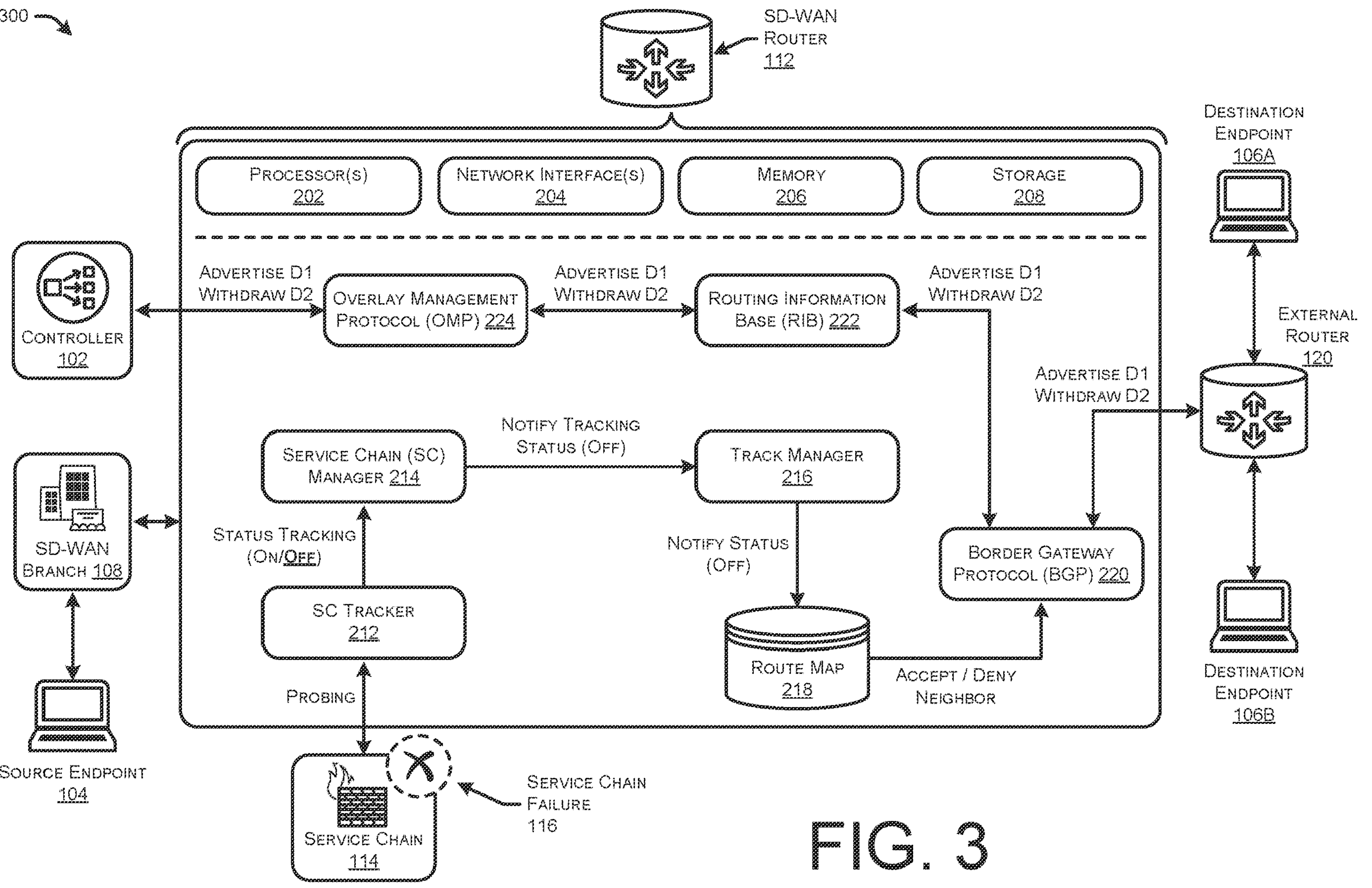
FIG. 3 illustrates a component diagram of an example SD-WAN router that advertises or withdraws a destination route with an external router based on the state of a local instance of service chain of the SD-WAN router.

FIG. 3 illustrates a component diagram 300 of an example SD-WAN router 112 that advertises or withdraws a destination route with an external router 120 based on the state of a local instance of service chain 114 of the SD-WAN router 112. Insofar as the components of FIG. 3 are numbered the same as those in FIG. 2, the associated description and functionality described with respect to FIG. 2 is also applicable for FIG. 3.

As noted above, the track object is referenced in the route-map 218 and the route-map 218 will be reevaluated every time the service chain's 114 state changes (in addition to reevaluating under regular conditions). The SD-WAN router 112 may use the route-map 218 to determine whether to advertise or withdraw a route or a neighbor. This is a highly flexible way to influence routing as it gives the user the power to make specific routes dependent on the state of a service chain 114 and can influence advertisement/withdrawal in both directions. The same method also allows the state of a BGP session to be influenced by service chain state.

As an example, the route-map 218 may be, in the case of BGP, applied to a neighbor command called "state" that takes the route-map 218 as a direction-independent parameter. BGP 220 may allow a neighbor (e.g., external router 120, destination endpoint 106, etc.) to be accepted or denied by evaluating the route-map 218. When the tracker state received by the track manager 216 changes, the route-map 218 is evaluated immediately and BGP 220 gets informed if the neighbor is to be accepted or denied.

As shown in FIG. 3, the external router 120 may provide routes to a destination endpoint 106A as well as destination endpoint 106B. In this example, network traffic communicated with destination endpoint 106B may need to be service chained by the service chain 114, but network traffic communicated with destination endpoint 106A may not need to be service chained. Accordingly, the service chain failure 116 may only affect the route to destination endpoint 106B because traffic communicated with destination endpoint 106A is not affected by the service chain failure 116.

The track object is referenced in the route-map 218 and the route-map 218 will be reevaluated every time the service chain's 114 state changes (in addition to reevaluating under regular conditions). The SD-WAN router 112 may use the route-map 218 to determine whether or not to withdraw a destination route, such as a route to destination endpoint 106B.

In examples where the state of the service chain 114 is off or unavailable, the SD-WAN router 112 may use the route-map 218 to determine that the service chain 114 is unavailable, and determine to withdraw a route D2 to the destination endpoint 106B, but continue to advertise a route D1 with destination endpoint 106A. In this way, the external router 120 may know that network traffic communicated with destination endpoint 106B may not longer be routed through the SD-WAN router 112 due to the service chain failure 116, but traffic communicated with the destination endpoint 106A may continue to be communicated through the SD-WAN router 112 despite the service chain failure 116.

Thus, the route-map 218 is applied in an outgoing direction so that Local Area Network (LAN) routes can be withdrawn using BGP update messages, and the route-map 218 may also be applied in an incoming direction so that destination routes can be withdrawn by BGP 220 from the routing information base (RIB) 222 based on the state of the service chain 114.

By withdrawing the destination route D2 to the destination endpoint 106B via the SD-WAN router 112 from the RIB 222, the SD-WAN router 112 may use OMP 224 to withdraw the destination route D2 from the SD-WAN fabric 100, but continue to advertise the route D! with the destination endpoint 106A.

In this example, OMP 224 is used to signal to the controller 102 that the destination route D2 has been withdrawn from the SD-WAN fabric 100. The controller 102 may then signal to all SD-WAN devices in the SD-WAN fabric 100 that the destination route D2 to the external router 120 and/or destination endpoint 106B through the SD-WAN router 112 is withdrawn, and a different SD-WAN router 112 it to be used that has an associated service chain 114 that is available.

In this way, the state of the service chain 114 is used by the SD-WAN router 112 to withdraw routes to destination endpoints 106 for which network traffic needs to be inspected by the service chain 114 in response to the service chain 114 experiencing a service chain failure 116.

Figure 4:
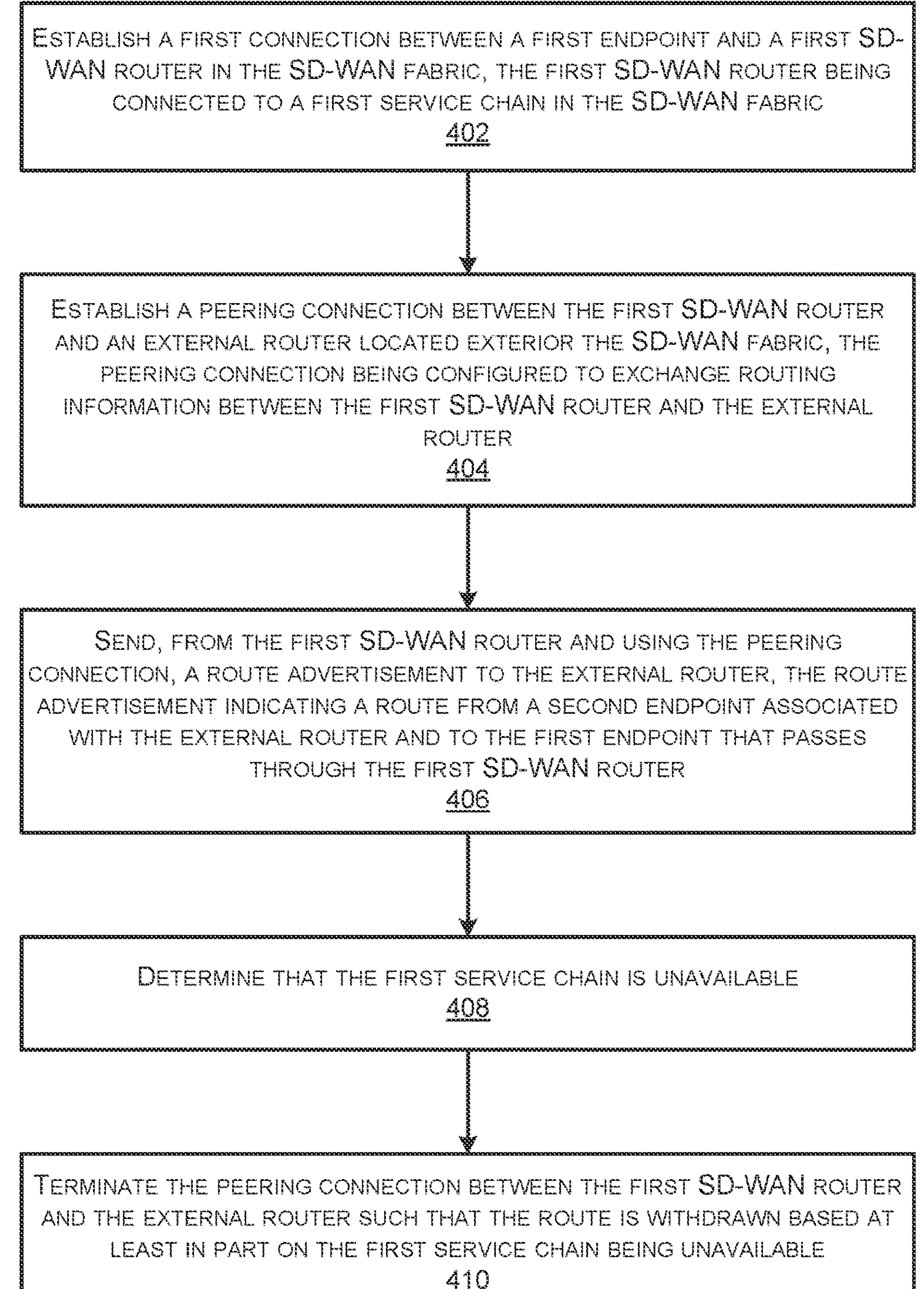
FIG. 4 illustrates a flow diagram of an example method for an SD-WAN router to terminate a peering session with an external router based on the state of a local instance of service chain of the SD-WAN router.
Figure 5:
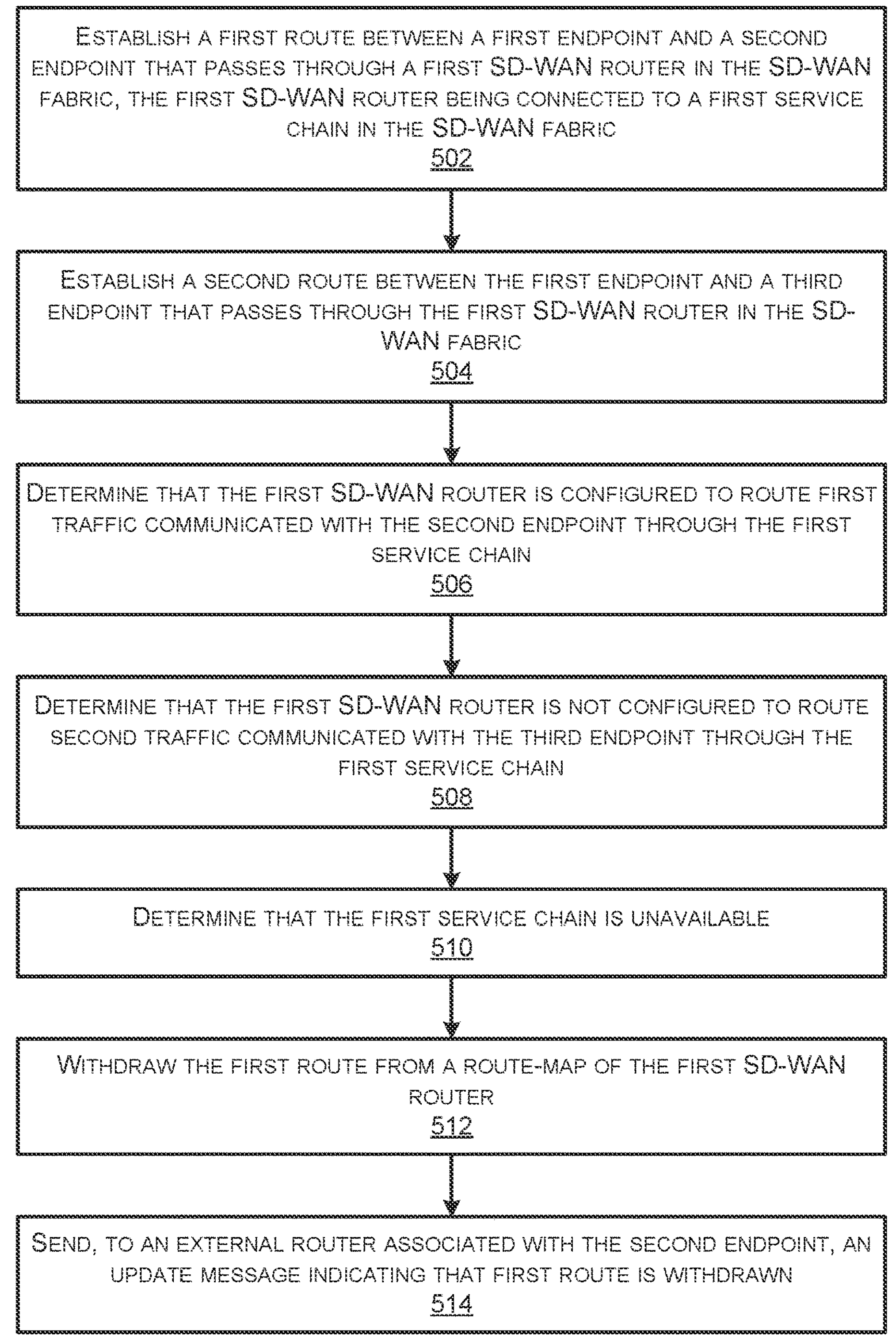
FIG. 5 illustrates a flow diagram of an example method for an SD-WAN router to withdraw a destination route with an external router based on the state of a local instance of service chain of the SD-WAN router.

FIGS. 4 and 5 illustrate flow diagrams of example methods 400 and 500 that illustrate aspects of the functions performed at least partly by the devices in the distributed application architecture as described in FIGS. 1-3B. The logical operations described herein with respect to FIGS. 4 and 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 4 and 5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, or different arrangements of components.

FIG. 4 illustrates a flow diagram of an example method 400 for an SD-WAN router 112 to terminate a peering session with an external router 120 based on the state of a local instance of service chain 114 of the SD-WAN router 112.

At 402, the first SD-WAN router 112A may establish a first connection between a first endpoint and a first SD-WAN router in the SD-WAN fabric, where the first SD-WAN router being connected to a first service chain in the SD-WAN fabric. As an example, the source endpoint 104 may establish a connection with an SD-WAN router 112 in the SD-WAN fabric 100, where the SD-WAN router 112A is connected to the service chain 114A.

At 404, the first SD-WAN router 112A may establish a peering connection between the first SD-WAN router 112A and an external router 120 located exterior the SD-WAN fabric 100. In some examples, the peering connection is configured to exchange routing information between the first SD-WAN router 112A and the external router 120.

At 406, the first SD-WAN router 112 may send, from the first SD-WAN router 112A and using the peering connection, a route advertisement to the external router 120. In some examples, the route advertisement indicates a route from a second endpoint (e.g., destination endpoint 106) associated with the external router 120 and to the first endpoint (e.g., source endpoint 14) that passes through the first SD-WAN router 112A.

At 408, the first SD-WAN router 112A may determine that the first service chain 114A is unavailable.

In some instances, determining that the first service chain 114A is unavailable may include sending, from the first SD-WAN router 112A, probes to the first service chain 114A, where the probes are configured to determine a current state of the first service chain 114A. Additionally, the method 400 may include applying, by the first SD-WAN router, logic to one or more of the probes to determine that the first service chain 114A is unavailable, and updating, at the first SD-WAN router 112A, a track object to indicate that the current state of the first service chain 114A is unavailable, where the track object is referenced by a route-map 218 stored at the first SD-WAN router 112A. Finally, the method 400 may include, based at least in part on the track object indicating that the first service chain 114A is unavailable, withdrawing the route from the route-map 218.

At 410, the first SD-WAN router 112A may, based at least in part on the first service chain 114A being unavailable, terminate the peering connection between the first SD-WAN router 112A and the external router 120 such that the route is withdrawn.

In some examples, the method 400 further includes determining that the first SD-WAN router 112A routes all traffic through the first service chain 114A, and in such examples, terminating the peering connection is further based at least in part on the SD-WAN router 112A routing all the traffic through the first service chain 114A.

In some instances, the method 400 further includes sending, from the first SD-WAN router 112A, an instruction for a controller 102 associated with the SD-WAN fabric 100 to withdraw the route between the first endpoint 104 and the second endpoint 106, and sending, from the controller 102, a notification to an internal router (e.g., SD-WAN branch 108) of the SD-WAN fabric 100 indicating that the route is withdrawn, where the internal router is configured to communicate traffic between the first endpoint 104 and the first SD-WAN router 112A.

After terminating the peering connection, the method 400 may further include sending, from the first SD-WAN router 112A, probes to the first service chain 114A, where the probes are configured to determine a current state of the first service chain 114. The method 400 may further include determining, by the first SD-WAN router 112A and using one or more of the probes, that the first service chain 114A is available, and establishing a second peering connection between the first SD-WAN router and the external router. Additionally, the method 400 may include sending, from the first SD-WAN router 112A and using the second peering connection, a second route advertisement to the external router 120 indicating a second route from the second endpoint 106 associated with the external router 120 and to the first endpoint 104 that passes through the first SD-WAN router 112A.

FIG. 5 illustrates a flow diagram of an example method 500 for an SD-WAN router 112 to withdraw a destination route with an external router 120 based on the state of a local instance of service chain 114 of the SD-WAN router 112.

At 502, the first SD-WAN router 112A may establish a first route between a first endpoint 104 and a second endpoint 106A that passes through a first SD-WAN router 112A in the SD-WAN fabric 100. In some instances, the first SD-WAN router 112A is connected to a first service chain 114A in the SD-WAN fabric 100.

At 504, the first SD-WAN router 112A may establish a second route between the first endpoint 104 and a third endpoint 106B that passes through the first SD-WAN router 112A in the SD-WAN fabric 100.

At 506, the first SD-WAN router 112A may determine that the first SD-WAN router 112A is configured to route first traffic communicated with the second endpoint 106A through the first service chain 114A (e.g., based on network policy).

At 508, the first SD-WAN router 112A may determine that the first SD-WAN router 112A is not configured to route second traffic communicated with the third endpoint 106B through the first service chain 114A (e.g., based on network policy).

At 510, the first SD-WAN router 112A may determine that the first service chain 114A is unavailable.

At 512, the first SD-WAN router 112A may, based at least in part on the first service chain 114A being unavailable and the first SD-WAN router 112A being configured to route the first traffic communicated with the second endpoint 106A through the first service chain, withdraw the first route from a route-map 218 of the first SD-WAN router 112A, and at 514, send, to an external router 120 associated with the second endpoint, an update message (e.g., BGP update message) indicating that first route is withdrawn.

Figure 6:
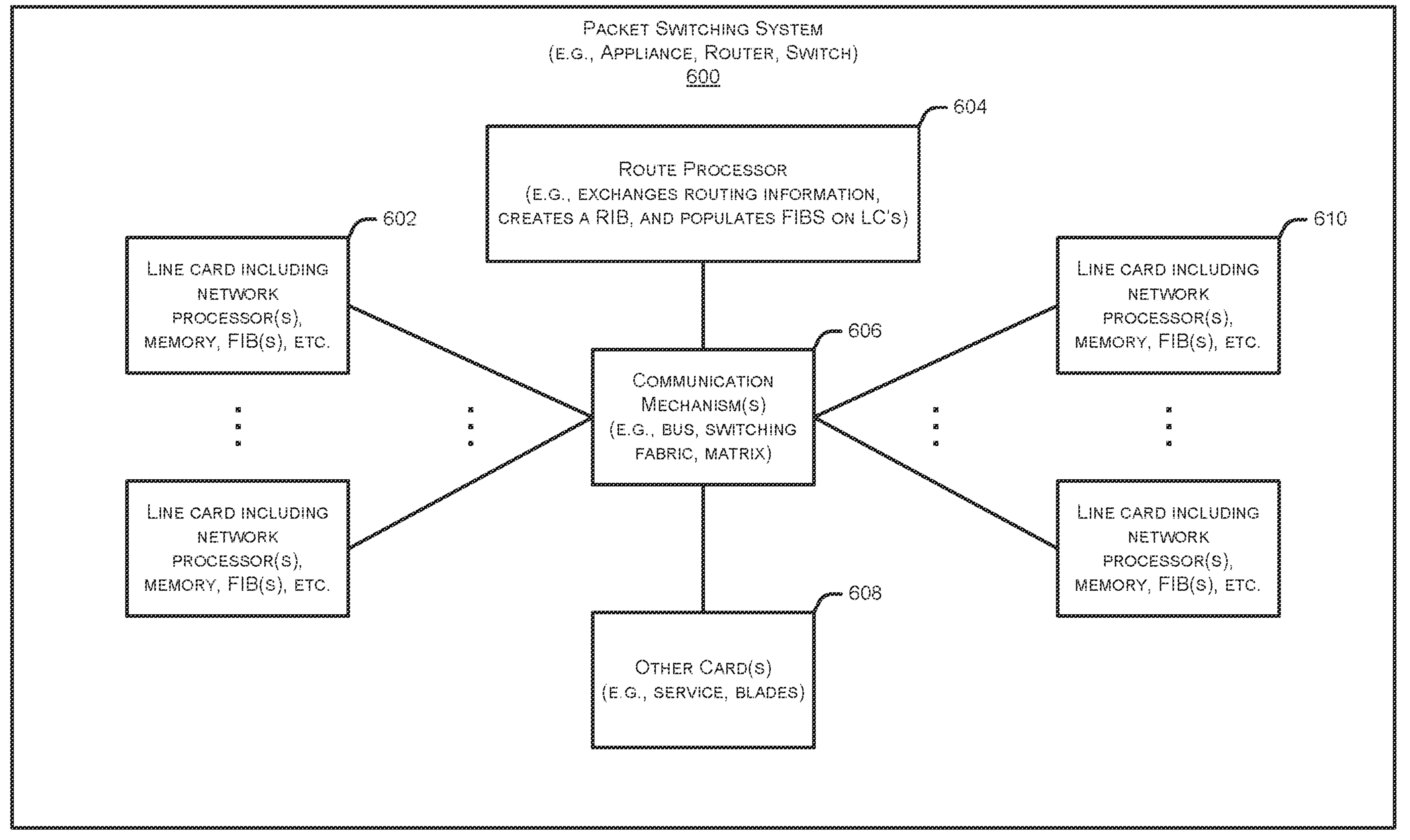
FIG. 6 illustrates a block diagram illustrating an example packet switching system that can be utilized to implement various aspects of the technologies disclosed herein.

FIG. 6 illustrates a block diagram illustrating an example packet switching device (or system) 600 that can be utilized to implement various aspects of the technologies disclosed herein. In some examples, packet switching device(s) 600 may be employed in various networks, such as an SD-Wan router 112 in the SD-WAN fabric 100 as described with respect to FIGS. 1-5.

In some examples, a packet switching device 600 may comprise multiple line card(s) 602, 610, each with one or more network interfaces for sending and receiving packets over communications links (e.g., possibly part of a link aggregation group). The packet switching device 600 may also have a control plane with one or more processing elements 605 for managing the control plane and/or control plane processing of packets associated with forwarding of packets in a network. The packet switching device 600 may also include other cards 608 (e.g., service cards, blades) which include processing elements that are used to process (e.g., forward/send, drop, manipulate, change, modify, receive, create, duplicate, apply a service) packets associated with forwarding of packets in a network. The packet switching device 600 may comprise hardware-based communication mechanism 606 (e.g., bus, switching fabric, and/or matrix, etc.) for allowing its different entities 602, 604, 608 and 610 to communicate. Line card(s) 602, 610 may typically perform the actions of being both an ingress and/or an egress line card 602, 610, in regard to multiple other particular packets and/or packet streams being received by, or sent from, packet switching device 600.

Figure 7:
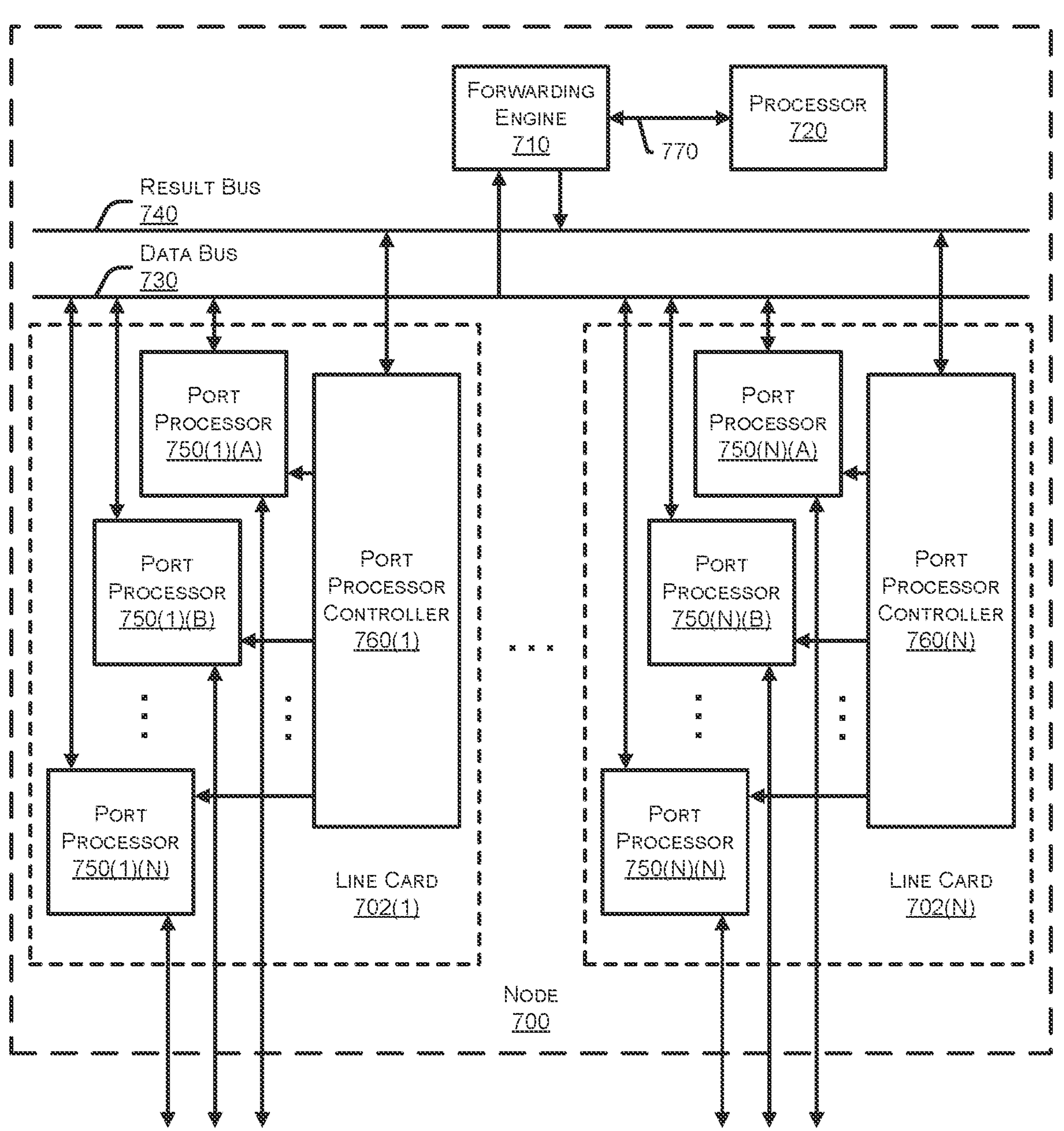
FIG. 7 illustrates a block diagram illustrating certain components of an example node that can be utilized to implement various aspects of the technologies disclosed herein.

FIG. 7 illustrates a block diagram illustrating certain components of an example node 700 that can be utilized to implement various aspects of the technologies disclosed herein. In some examples, node(s) 700 may be employed in various networks, such as an SD-Wan router 112 in the SD-WAN fabric 100 as described with respect to FIGS. 1-5.

In some examples, node 700 may include any number of line cards 702 (e.g., line cards 702(1)-(N), where N may be any integer greater than 1) that are communicatively coupled to a forwarding engine 710 (also referred to as a packet forwarder) and/or a processor 720 via a data bus 730 and/or a result bus 740. Line cards 702(1)-(N) may include any number of port processors 750(1)(A)-(N)(N) which are controlled by port processor controllers 760(1)-(N), where N may be any integer greater than 1. Additionally, or alternatively, forwarding engine 710 and/or processor 720 are not only coupled to one another via the data bus 730 and the result bus 740, but may also communicatively coupled to one another by a communications link 770.

The processors (e.g., the port processor(s) 750 and/or the port processor controller(s) 760) of each line card 702 may be mounted on a single printed circuit board. When a packet or packet and header are received, the packet or packet and header may be identified and analyzed by node 700 (also referred to herein as a router) in the following manner. Upon receipt, a packet (or some or all of its control information) or packet and header may be sent from one of port processor (s) 750(1)(A)-(N)(N) at which the packet or packet and header was received and to one or more of those devices coupled to the data bus 830 (e.g., others of the port processor (s) 750(1)(A)-(N)(N), the forwarding engine 710 and/or the processor 720). Handling of the packet or packet and header may be determined, for example, by the forwarding engine 710. For example, the forwarding engine 710 may determine that the packet or packet and header should be forwarded to one or more of port processors 750(1)(A)-(N)(N). This may be accomplished by indicating to corresponding one(s) of port processor controllers 760(1)-(N) that the copy of the packet or packet and header held in the given one(s) of port processor(s) 750(1)(A)-(N)(N) should be forwarded to the appropriate one of port processor(s) 750(1)(A)-(N)(N). Additionally, or alternatively, once a packet or packet and header has been identified for processing, the forwarding engine 710, the processor 720, and/or the like may be used to process the packet or packet and header in some manner and/or maty add packet security information in order to secure the packet. On a node 700 sourcing such a packet or packet and header, this processing may include, for example, encryption of some or all of the packets or packet and header's information, the addition of a digital signature, and/or some other information and/or processing capable of securing the packet or packet and header. On a node 700 receiving such a processed packet or packet and header, the corresponding process may be performed to recover or validate the packet's or packet and header's information that has been secured.

Figure 8:
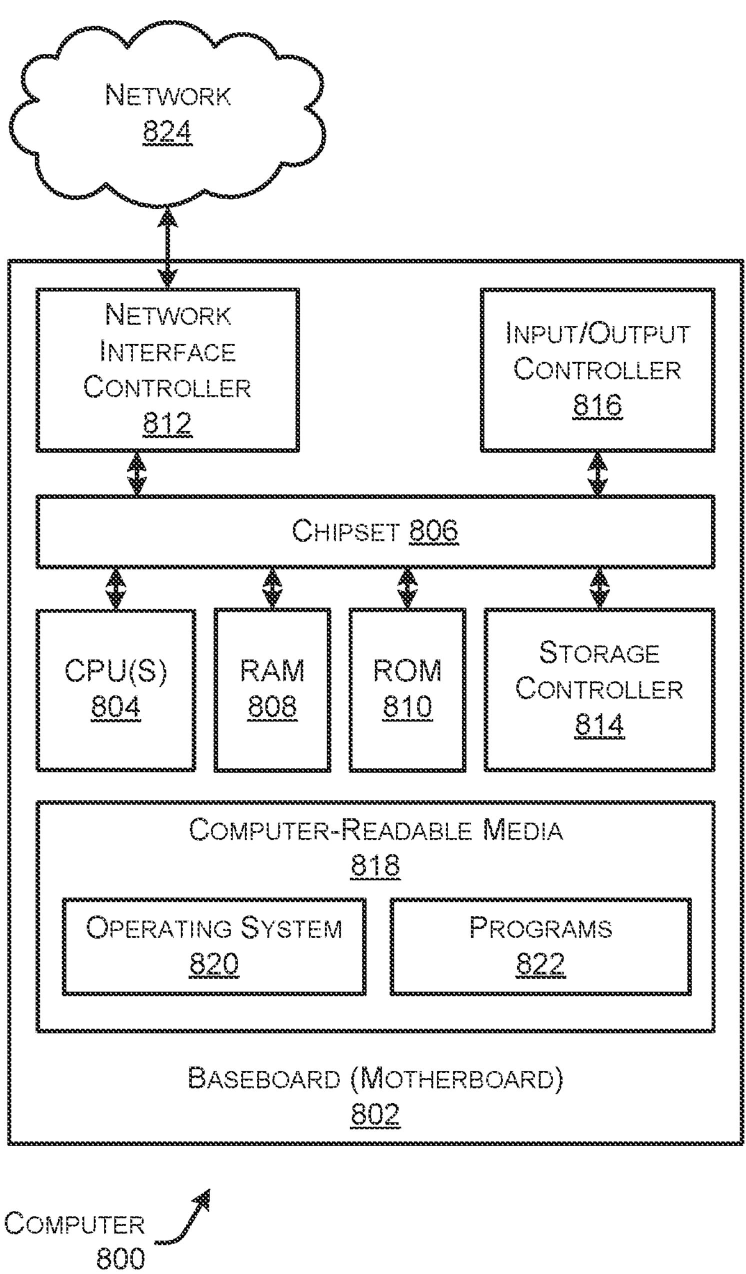
FIG. 8 is a computer architecture diagram showing an illustrative computer hardware architecture for implementing a computing device that can be utilized to implement aspects of the various technologies presented herein.

FIG. 8 is a computer architecture diagram showing an illustrative computer hardware architecture for implementing a computing device that can be utilized to implement aspects of the various technologies presented herein.

The computer architecture shown in FIG. 8 illustrates a conventional server computer, workstation, desktop computer, laptop, tablet, network appliance, e-reader, smartphone, or other computing device, and can be utilized to execute any of the software components presented herein. The computer 800 may, in some examples, correspond to a physical server described herein, and may comprise networked devices such as servers, switches, routers, hubs, bridges, gateways, modems, repeaters, access points, etc.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network 824, such as a local area network (LAN), a WAN, PAN, etc. The chipset 806 can include functionality for providing network connectivity through a NIC 812, such as a gigabit Ethernet adapter. The NIC 812 is capable of connecting the computer 800 to other computing devices over the network 824. It should be appreciated that multiple NICs 812 can be present in the computer 800, connecting the computer to other types of networks and remote computer systems.

The computer 800 can be connected to a storage device 818 that provides non-volatile storage for the computer. The storage device 818 can store an operating system 820, programs 822, and data, which have been described in greater detail herein. The storage device 818 can be connected to the computer 800 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations performed by devices in the network fabric, such as the SD-WAN routers 112, and or any components included therein, may be supported by one or more devices similar to computer 800. Stated otherwise, some or all of the operations performed by the devices in the network fabric 100, and or any components included therein, may be performed by one or more computers 800 operating in any arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 800. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 818 can store other system or application programs and data utilized by the computer 800.

In one embodiment, the storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes described above with regard to FIGS. 1-7. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

As described herein, the computer 800 may comprise one or more of a router, load balancer, switch, gateway, and/or another network device. The computer 800 may include one or more hardware processors 804 (processors) configured to execute one or more stored instructions. The processor(s) 804 may comprise one or more cores. Further, the computer 800 may include one or more network interfaces configured to provide communications between the computer 800 and other devices, such as the communications described herein as being performed by the devices described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 822 may comprise any type of programs or processes to perform the techniques described in this disclosure for providing an SD-WAN router 112 that is capable of performing the techniques described herein. The programs 822 may comprise any type of program that cause the computer 800 to perform techniques for communicating with other devices using any type of protocol or standard usable for determining connectivity.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system configured to ensure symmetric routing in a software-defined wide-area network (SD-WAN) fabric during a service chain failure, the system comprising:

one or more processors; and one or more non-transitory computer-readable media storing computer-executable instructions that, when executed by the one or more processors, cause the one or more processors to perform operations comprising:

establishing a first connection between a first endpoint and a first SD-WAN router in the SD-WAN fabric, the first SD-WAN router being connected to a first service chain in the SD-WAN fabric;

establishing a peering connection between the first SD-WAN router and an external router located exterior the SD-WAN fabric, the peering connection being configured to exchange routing information between the first SD-WAN router and the external router;

sending, from the first SD-WAN router and using the peering connection, a route advertisement to the external router, the route advertisement indicating a route from a second endpoint associated with the external router and to the first endpoint that passes through the first SD-WAN router;

determining that the first service chain is unavailable; and based at least in part on the first service chain being unavailable, terminating the peering connection between the first SD-WAN router and the external router such that the route is withdrawn.

2. The system of claim 1, the operations further comprising:

determining that the first SD-WAN router routes all traffic through the first service chain, wherein the terminating the peering connection is further based at least in part on the SD-WAN router routing all the traffic through the first service chain.

3. The system of claim 1, the operations further comprising:

sending, from the first SD-WAN router, an instruction for a controller associated with the SD-WAN fabric to withdraw the route between the first endpoint and the second endpoint; and sending, from the controller, a notification to an internal router of the SD-WAN fabric indicating that the route is withdrawn, the internal router configured to communicate traffic between the first endpoint and the first SD-WAN router.

4. The system of claim 1, the operations further comprising:

establishing a second connection between the first endpoint and a second SD-WAN router in the SD-WAN fabric, the second SD-WAN router being connected to a second service chain in the SD-WAN fabric;

sending, from the second SD-WAN router, a second route advertisement to the external router, the second route advertisement indicating a second route from the second endpoint associated with the external router and to the first endpoint that passes through the second SD-WAN router;

receiving, at the second SD-WAN router, traffic to be communicated between the first endpoint and the second endpoint; and routing the traffic through the second service chain.

5. The system of claim 1, the operations further comprising:

sending, from the first SD-WAN router, probes to the first service chain, wherein the probes are configured to determine a current state of the first service chain;

applying, by the first SD-WAN router, logic to one or more of the probes to determine that the first service chain is unavailable;

updating, at the first SD-WAN router, a track object to indicate that the current state of the first service chain is unavailable, the track object being referenced by a route-map stored at the first SD-WAN router; and based at least in part on the track object indicating that the first service chain is unavailable, withdrawing the route from the route-map.

6. The system of claim 1, the operations further comprising:

sending, from the first SD-WAN router, probes to the first service chain, wherein the probes are configured to determine a current state of the first service chain;

determining, by the first SD-WAN router and using one or more of the probes, that the first service chain is available;

establishing a second peering connection between the first SD-WAN router and the external router; and sending, from the first SD-WAN router and using the second peering connection, a second route advertisement to the external router indicating a second route from the second endpoint associated with the external router and to the first endpoint that passes through the first SD-WAN router.

7. The system of claim 1, wherein:

the first SD-WAN router is an SD-WAN router in a site of the SD-WAN fabric;

the external router is a cloud edge router and the route advertisement is Border Gateway Protocol (BGP) advertisement; and the second endpoint is located in a cloud environment associated with the cloud edge router.

8. A computer-implemented method comprising:

establishing a first connection between a first endpoint and a first SD-WAN router in a software-defined wide-area network (SD-WAN) fabric, the first SD-WAN router being connected to a first service chain in the SD-WAN fabric;

establishing a peering connection between the first SD-WAN router and an external router located exterior the SD-WAN fabric, the peering connection being configured to exchange routing information between the first SD-WAN router and the external router;

sending, from the first SD-WAN router and using the peering connection, a route advertisement to the external router, the route advertisement indicating a route from a second endpoint associated with the external router and to the first endpoint that passes through the first SD-WAN router;

determining that the first service chain is unavailable; and based at least in part on the first service chain being unavailable, terminating the peering connection between the first SD-WAN router and the external router such that the route is withdrawn.

9. The computer-implemented method of claim 8, further comprising:

determining that the first SD-WAN router routes all traffic through the first service chain, wherein the terminating the peering connection is further based at least in part on the SD-WAN router routing all the traffic through the first service chain.

10. The computer-implemented method of claim 8, further comprising:

sending, from the first SD-WAN router, an instruction for a controller associated with the SD-WAN fabric to withdraw the route between the first endpoint and the second endpoint; and sending, from the controller, a notification to an internal router of the SD-WAN fabric indicating that the route is withdrawn, the internal router configured to communicate traffic between the first endpoint and the first SD-WAN router.

11. The computer-implemented method of claim 8, further comprising:

establishing a second connection between the first endpoint and a second SD-WAN router in the SD-WAN fabric, the second SD-WAN router being connected to a second service chain in the SD-WAN fabric;

sending, from the second SD-WAN router, a second route advertisement to the external router, the second route advertisement indicating a second route from the second endpoint associated with the external router and to the first endpoint that passes through the second SD-WAN router;

receiving, at the second SD-WAN router, traffic to be communicated between the first endpoint and the second endpoint; and routing the traffic through the second service chain.

12. The computer-implemented method of claim 8, further comprising:

sending, from the first SD-WAN router, probes to the first service chain, wherein the probes are configured to determine a current state of the first service chain;

applying, by the first SD-WAN router, logic to one or more of the probes to determine that the first service chain is unavailable;

updating, at the first SD-WAN router, a track object to indicate that the current state of the first service chain is unavailable, the track object being referenced by a route-map stored at the first SD-WAN router; and based at least in part on the track object indicating that the first service chain is unavailable, withdrawing the route from the route-map.

13. The computer-implemented method of claim 8, further comprising:

sending, from the first SD-WAN router, probes to the first service chain, wherein the probes are configured to determine a current state of the first service chain;

determining, by the first SD-WAN router and using one or more of the probes, that the first service chain is available;

establishing a second peering connection between the first SD-WAN router and the external router; and sending, from the first SD-WAN router and using the second peering connection, a second route advertisement to the external router indicating a second route from the second endpoint associated with the external router and to the first endpoint that passes through the first SD-WAN router.

14. The computer-implemented method of claim 8, wherein:

the first SD-WAN router is an SD-WAN router in a site of the SD-WAN fabric;

the external router is a cloud edge router and the route advertisement is Border Gateway Protocol (BGP) advertisement; and the second endpoint is located in a cloud environment associated with the cloud edge router.

15. One or more computing devices configured to ensure symmetric routing in a software-defined wide-area network (SD-WAN) fabric during a service chain failure, the one or more computing devices comprising:

one or more processors; and one or more non-transitory computer-readable media storing computer-executable instructions that, when executed by the one or more processors, cause the one or more processors to perform operations comprising:

establishing a first route between a first endpoint and a second endpoint that passes through a first SD-WAN router in the SD-WAN fabric, the first SD-WAN router being connected to a first service chain in the SD-WAN fabric;

establishing a second route between the first endpoint and a third endpoint that passes through the first SD-WAN router in the SD-WAN fabric;

determining that the first SD-WAN router is configured to route first traffic communicated with the second endpoint through the first service chain;

determining that the first SD-WAN router is not configured to route second traffic communicated with the third endpoint through the first service chain;

determining that the first service chain is unavailable; and based at least in part on the first service chain being unavailable and the first SD-WAN router being configured to route the first traffic communicated with the second endpoint through the first service chain:

withdrawing the first route from a route-map of the first SD-WAN router; and sending, to an external router associated with the second endpoint, an update message indicating that first route is withdrawn.

16. The one or more computing devices of claim 15, the operations further comprising:

sending, from the first SD-WAN router, an instruction for a controller associated with the SD-WAN fabric to withdraw the first route between the first endpoint and the second endpoint; and sending, from the controller, a notification to an internal router of the SD-WAN fabric indicating that the route is withdrawn, the internal router configured to communicate traffic between the first endpoint and the first SD-WAN router.

17. The one or more computing devices of claim 15, the operations further comprising:

sending, from the first SD-WAN router, probes to the first service chain, wherein the probes are configured to determine a current state of the first service chain;

applying, by the first SD-WAN router, logic to one or more of the probes to determine that the first service chain is unavailable; and updating, at the first SD-WAN router, a track object to indicate that the current state of the first service chain is unavailable, the track object being referenced by a route-map stored at the first SD-WAN router, wherein the withdrawing the route from the route-map is based at least in part on the track object indicating that the first service chain is unavailable.

18. The one or more computing devices of claim 15, the operations further comprising:

sending, from the first SD-WAN router, probes to the first service chain, wherein the probes are configured to determine a current state of the first service chain;

determining, by the first SD-WAN router and using one or more of the probes, that the first service chain is available;

adding a third route to a route-map of the first SD-WAN router, the third route being between the first endpoint and the second endpoint that passes through the first SD-WAN router; and sending, to the external router, an advertisement message indicating that third route is available.

19. The one or more computing devices of claim 15, the operations further comprising:

establishing a third route between the first endpoint and the second endpoint that passes through a second SD-WAN router in the SD-WAN fabric, the second SD-WAN router being connected to a second service chain in the SD-WAN fabric;

prior to the first service chain being unavailable, sending a first discriminator to the external router indicating that the first route is a preferred route for the second endpoint; and subsequent to the first service chain being unavailable, sending a second discriminator to the external router indicating that the second route is a preferred route for the second endpoint to reach the first endpoint.

20. The one or more computing devices of claim 15, wherein:

the first SD-WAN router is an SD-WAN router in a site of the SD-WAN fabric;

the external router is a cloud edge router and the update message is Border Gateway Protocol (BGP) message; and the second endpoint is located in a cloud environment associated with the cloud edge router.

* * * * *